United States Patent
Ennis, Jr. et al.

[15] 3,638,111
[45] Jan. 25, 1972

[54] APPARATUS FOR MEASURING ION OR ELECTRON BEAM WIDTH BY MONITORING SECONDARY EMISSION FROM A MOVING PROBE

[72] Inventors: Robert M. Ennis, Jr., Oakridge, Tenn.; Robert G. Wilson, Canoga Park, Calif.

[73] Assignee: Hughes Aircraft Company, Culver City, Calif.

[22] Filed: Apr. 29, 1970

[21] Appl. No.: 33,017

[52] U.S. Cl. ..........................................324/71 EB, 250/49.5
[51] Int. Cl. ........................................................G01n 27/00
[58] Field of Search................324/71 R, 71 EB; 250/49.5 R, 250/49.5 A

[56] References Cited

OTHER PUBLICATIONS

Okabe et al., Beam Profle Measurements for Electron Accelerators, Japanese Journal of Applied Physics, Vol. 5, No. 1, Jan, 1966, pp. 68–73

*Primary Examiner*—Rudolph V. Rolinec
*Assistant Examiner*—R. J. Corcoran
*Attorney*—W. H. MacAllister, Jr. and Allen A. Dicke, Jr.

[57] ABSTRACT

A device for measuring and displaying selected characteristics (i.e., the intensity profile distribution, the shape and the width) of molecular and/or submolecular particle beams, such as ion or electron beams, in which the beam width may be of the order of 5 microns or less, is disclosed. The device comprises a thin wire (at least 10 mils in diameter) having a very narrow zone such as a thin groove (less than 5 microns wide) along a portion of its length. When there is relative movement between the beam and the wire so that the grooved portion of the wire is passed transversely through the beam, a secondary charged particle emission current dependent upon the beam intensity and angle of incidence with the wire surface is generated and displayed on an oscilloscope as a beam intensity profile. The width of the beam is a function of the width of that portion of the profile resulting from movement of the groove across the beam.

13 Claims, 5 Drawing Figures

PATENTED JAN 25 1972 3,638,111
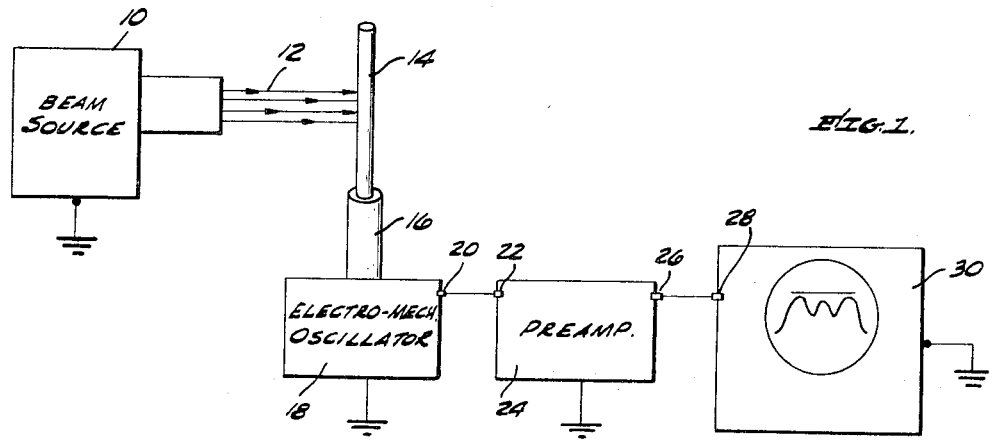
FIG. 1.
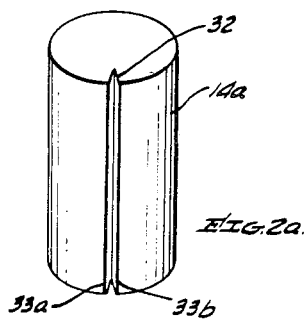 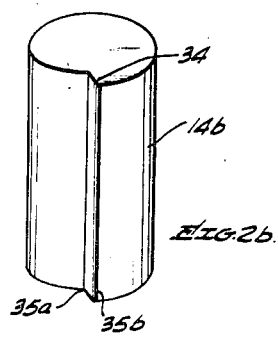 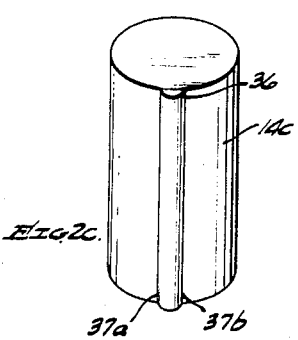
FIG. 2a.    FIG. 2b.    FIG. 2c.
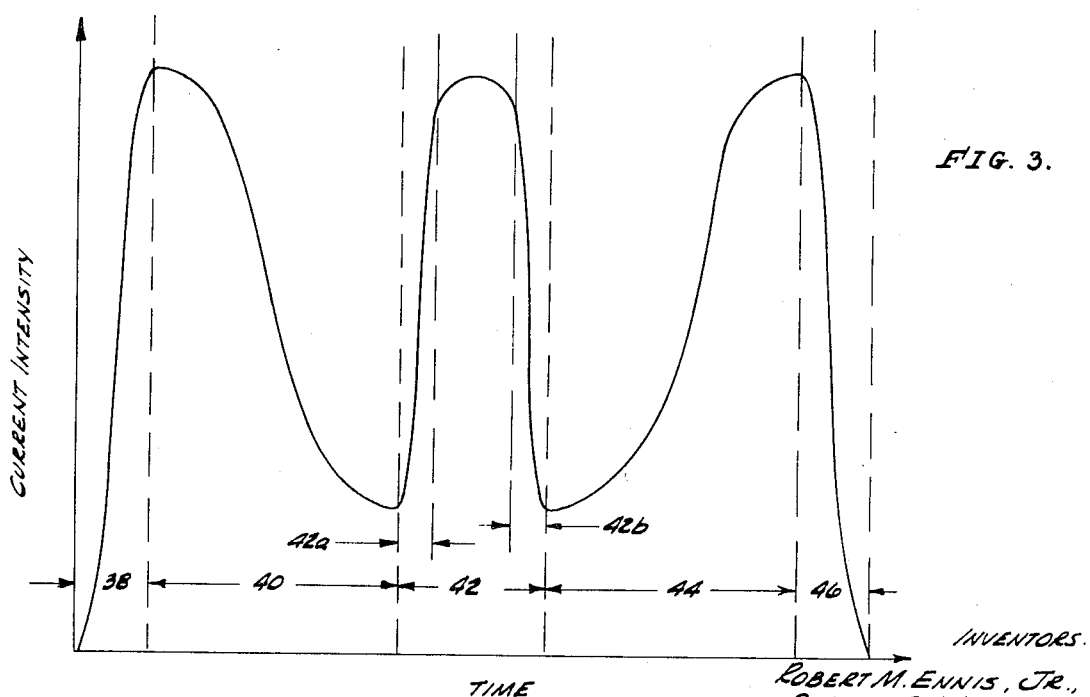
FIG. 3.
INVENTORS.
ROBERT M. ENNIS, JR.,
ROBERT G. WILSON,
BY Paul M. Cole
ATTORNEY.

APPARATUS FOR MEASURING ION OR ELECTRON BEAM WIDTH BY MONITORING SECONDARY EMISSION FROM A MOVING PROBE

This invention relates to measuring apparatus generally, and more particularly to apparatus for measuring micron-width beams of molecular and/or submolecular particles.

This invention relates to measuring apparatus generally, and more particularly to apparatus for measuring micron-width beams of molecular and/or submolecular particles.

As used throughout this specification, the term particle refers to an energetic or energized element of matter which may be accelerated and controlled by means of an energy source and which produces secondary charged particle (electron and/or ion) emission current in an electrical conductor upon the occurrence of incidence with the conductor. The term beam refers to pluralities of such particles traversing a defined path or volume.

Using a thin wire to measure the width of a beam of molecular or submolecular particles is known in the art. Typically, a wire is scanned back and forth through the beam such that the motion of the longitudinal axis of the wire is transverse to the longitudinal axis of the beam and transverse to the longitudinal axis of the wire. When the beam is incident on the surface of the wire, a secondary charged particle emission current is created in the wire, amplified, and displayed as a standing wave on an oscilloscope. This current is proportional to the intensity of the portion of the beam incident on the wire at any given time. Therefore, when the beam intensity profile is displayed on the oscilloscope, the width of the beam may be computed by subtracting the wire diameter from the calibrated width of the profile.

A conventional method for calibrating the oscilloscope is as follows. A plate with precisely machined slots is positioned with the plane of the plate normal to the direction of the beam so that the slotted part of the plate intercepts the beam before it reaches the wire. Beam particles will be transmitted through the slots only. The time variation of the resulting secondary emission current which represents the intensity of the slotted beam will provide calibration of the horizontal (time) axis of the oscilloscope because the width of the slots is known. After the oscilloscope is calibrated and the slotted plate removed, the beam intensity distribution can be continuously monitored.

During the scanning operation, when the leading edge of the wire intercepts the near edge of the beam, secondary charged particle emission current commences, and this current increases as the wire moves through the beam and greater portions of the wire intercept the beam. After the leading edge of the wire emerges from the beam, the current decreases as smaller portions of the wire intercept the beam. The secondary emission current ceases after the trailing edge of the wire has passed the far edge of the beam. The time required for the leading edge of the wire to move from the near edge to the far edge of the beam is indicative of the beam width, while the time required for the diameter of the wire to cross an edge of the beam (such as the far edge) is indicative of the wire diameter. When the wire is of negligible diameter compared to the beam width, the width of the secondary emission current profile is indicative of the width of the beam. emission current profile is indicative of the width of the beam.

Identification of the extremities of the secondary emission current intensity profile is aided by the fact that the secondary emission current increases with increasing angle of incidence with the wire, the greatest increase occurring as the angle of incidence approaches 90°. The angle of incidence is herein defined as the angle that the longitudinal direction of the beam makes with the normal to the wire surface. Because the wire usually has a circular cross section (and hence the angle of incidence of the beam particles at the edge of the wire is essentially 90°), as the wire enters the beam the current increases from zero at a much faster rate than it would for a flat strip of wire, the angle of incidence with which would be essentially zero. As a result, the slope of the end portions of the secondary emission current profile display is quite steep. For a discussion of the dependency of secondary emission on angle of incidence, see "Physics and Applications of Secondary Electron Emission" by Dr. H. Bruining, M.B.E., Pergamon Press, 1954, pages 100–103.

As is true of all measurements, some error is involved in the measurement of the beam width. This error is the sum of the error in measuring the wire diameter and the error in determining the width of the profile on the oscilloscope screen. The wire diameter measurement error can be reduced to less than 1/10 percent by electron microscope measurements. The profile width measurement error results from the inability to read the horizontal (time) axis of the oscilloscope screen more accurately than to the nearest millimeter. Thus, on an oscilloscope screen in which the time axis is 10 centimeters long, the minimum error to be expected in reading the profile width is essentially 2 millimeters in 10 centimeters, or 2 percent (both ends of the profile must be determined). The error in measuring the wire diameter is negligible compared to the error in reading the oscilloscope.

In order to ensure mechanical stability during scanning, the wire thickness, or diameter, should be at least 5 mils. However, when wires of this diameter are used to measure beam widths on the order of 5 microns, the resultant secondary emission current profile (which is representative of the sum of the width of the beam and the diameter of the wire) will represent a width of about 130 microns (5 mils ≈125 microns). Even when this profile extends over the entire time axis (10 centimeters) on the aforementioned oscilloscope screen, the error in reading the profile width will correspond to about 2.6 microns, and error which is greater than 50 percent of the beam width.

Some particle beams are nonuniform in cross section or even geometrically irregular. For such beams, information about the particle distribution throughout the beam, commonly called the internal structure of the beam, is often desired and may be obtained by use of the aforementioned scanning wire technique. However, resolution of the particle distribution in the beam becomes poorer as the ratio of the wire diameter to the beam width increases. When the wire diameter-to-beam width ratio exceeds about $10^{-1}$, serious degradation in resolution begins to occur. When the ratio reaches 1, virtually all information about the internal structure of the beam is lost. Thus, when beam measuring apparatus of the prior art is employed, if the beam width is on the order of 100 microns, the internal structure of the beam cannot be determined with any satisfactory degree of accuracy, and for a beam width of 5 microns, it cannot be determined at all.

It is, therefore an object of this invention to provide improved apparatus which can be used to measure a particle beam width on the order of 5 microns or less.

It is, therefore, an object of this invention to provide improved apparatus which can be used to measure a particle beam width on the order of 5 microns or less.

It is another object of the present invention to provide apparatus which can be used to measure the width of particle beams more accurately and with better resolution than is possible by prior art apparatus.

Still another object of this invention is to provide apparatus which can be used to determine the internal structure of a particle beam of width on the order of 5 microns or less.

In accordance with the foregoing objects, apparatus according to the invention for indicating selected characteristics of a beam of secondary emission current producing particles includes a movable member having first and second surface regions of distinguishable secondary charged particle emission characteristics for incident secondary emission current producing particles traveling in a predetermined direction. The movable member defines at least two essentially linear boundaries between the first and second regions. The member is moved at an essentially uniform velocity through the beam such that each of the boundaries transverses the beam in a direction essentially transverse to the longitudinal direction of the beam and essentially transverse to the length of the boundaries. The secondary charged particle emission current resulting from the incidence of the beam on the first and second surface regions of the member during movement of the member through the beam is detected. When the detected secondary charged particle emission current is displayed as a time waveform, the width of that portion of the waveform resulting form impingement of the beam on the first surface region is indicative of the width of the beam.

The invention is described in greater detail with reference to the accompanying drawings, in which:

FIG. 1 is a schematic view illustrating apparatus according to the invention;

FIG. 1 is a schematic view illustrating apparatus according to the invention;

FIGS. 2 (a, b, and c) are perspective views of three beam scanning members which may be used in the apparatus of FIG. 1 according to respective embodiments of the invention; and FIG. 3 is an intensity-versus-time representation of the secondary emission current produced with the apparatus as the scanning member moves through the beam.

FIG. 3 is an intensity-versus-time representation of the secondary emission current produced with the apparatus as the scanning member moves through the beam.

Referring now to FIG. 1, there is shown a conventional secondary emission current producing particle beam source 10 emitting a beam 12. Scanning wire 14 is mounted on an arm 16 of a conventional electromechanical oscillator 18 which oscillates the wire 14 back and forth through the beam 12 at a uniform velocity. The motion of the longitudinal axis of the wire 14 is essentially transverse to the longitudinal direction of the beam 12 and essentially transverse to the longitudinal axis of the wire 14. The wire 14 is electrically coupled to an output terminal 20 of the oscillator 18. Terminal 20 is electrically coupled to an input terminal 22 of a conventional amplifier 24 which amplifies the current generated in the wire 14. An output terminal 26 of the amplifier 24 is electrically coupled to an input terminal 28 of a conventional oscilloscope 30 which displays the amplitude of the current in wire 14 as a function of time.

FIGS. 2 (a, b, and c) show alternative configurations for the beam scanning wire 14 of FIG. 1 in accordance with respective embodiments of the invention. The wire 14a of FIG. 2a defines a longitudinal groove 32 of an approximately V-shaped cross section and whose width is at most on the order of the width of the beam 12 and preferably is considerably smaller. For example, for a beam width on the order of 5 microns or less, the width of the groove 32 may be 1 micron or less. The width of the wire 14 is preferably at least 10 mils. The two edges 33a and 33b of the groove 32 constitute essentially linear boundaries between the lateral surface of the wire 14a and the surfaces of the groove 32. The length of groove 32 is greater than the largest diameter of beam 12 anticipated. The wire 14a is oriented so that groove 32 faces the direction of travel of the beam particles when the wire 14a traverses the beam 12. The surfaces of the groove 32 are steep, presenting a large incidence angle to the beam 12, whereas the wire lateral surface adjacent the groove 32 is essentially normal to the beam 12. As a result, the secondary charged particle emission characteristics of the surfaces of the groove 32 are distinguishable from those of the adjacent wire lateral surface for longitudinal traveling particles in the beam 12.

The wire 14b of FIG. 2b has a cross section of spiral configuration and an inclined longitudinal ridge 34 extending between lateral surface edges 35a and 35b which constitute essentially linear boundaries between the lateral surface of the wire 14b and the surface of the ridge 34. The width of the ridge 34 is at most on the order of the width of the beam 12 and preferably is considerably smaller. The ridge 34, like the groove 32, presents a steep angle of incidence to the beam 12, and its secondary charged particle emission characteristics are distinguishable from those of the wire lateral surface adjacent ridge 34 for longitudinally traveling particles in the beam 12.

The wire 14c of FIG. 2c has a longitudinally extending strip 36 of a material having secondary charged particle emission characteristics distinguishable from those of the wire material disposed along a portion of the lateral surface of the wire 14c which is to face the direction of travel of the beam particles. Although the strip 36 is shown raised on the surface of the wire 14c, it may also be embedded below, or flush with the wire surface. The width of the strip 36 is at most on the order of the width of the beam 12 and preferably is considerably smaller. The edges 37a and 37b of the strip 36 constitute essentially linear boundaries between the lateral surface of the wire 14c and the surface of the strip 36. lateral surface adjacent ridge 34 for longitudinally traveling particles in the beam 12.

The wire 14c of FIG. 2c has a longitudinally extending strip 36 of a material having secondary charged particle emission characteristics distinguishable from those of the wire material disposed along a portion of the lateral surface of the wire 14c which is to face the direction of travel of the beam particles. Although the strip 36 is shown raised on the surface of the wire 14c, it may also be embedded below, or flush with the wire surface. The width of the strip 36 is at most on the order of the width of the beam 12 and preferably is considerably smaller. The edges 37a and 37b of the strip 36 constitute essentially linear boundaries between the lateral surface of the wire 14c and the surface of the strip 36.

FIG. 3 is an idealized plot of the amplitude of the secondary emission current as a function of time as wire 14 traverses the cross section of the beam 12 at a uniform velocity. The curve in region 38 represents the current from the time when the leading edge of the wire 14 intercepts the near edge of the beam 12 to the time when the leading edge of the wire 14 has reached the far edge of the beam 12 and the entire cross section of the beam is incident on the wire 14. As the number of particles of beam 12 intercepted by wire 14 increases, an increasing number of secondary charged particles are emitted from the wire, causing the current to rise in region 38.

The curve in region 40 represents the secondary emission current from the time when the wire 14 first intercepts the entire cross section of the beam 12 to the time when the leading edge of the other secondary charged particle emission surface region of the wire 14 (i.e., groove 32, ridge 34, or strip 36) reaches the near edge of the beam 12. The current decreases to approximately one-fifth its peak value in region 40 because, as essentially the first half of the wire 14 traverses the beam 12, the angle of incidence of the beam 12 (with the normal to the surface of the wire 14) decreases from around 90° to approximately 0°. The current follows the secondary emission variation with angle of incidence discussed by the aforementioned Bruining text. The curve in region 42 represents the secondary emission current from the time when the particles at the near edge of the beam 12 are intercepted by the leading edge 33a of the groove 32 (or ridge 34 or strip 36) to the time when the particles at the far edge of beam 12 are intercepted by the trailing edge 33b of the groove 32. Since groove 32 presents a relatively large angle of incidence to particles of beam 12, the current rises sharply after the beam particles are first intercepted by the groove 32. This portion of the curve is shown in FIG. 3 as region 42a. The current continues to increase as a greater portion of the beam cross section is intercepted by the groove 32. If the beam 12 is approximately circular in cross section, the current reaches an approximate peak when the center of the beam 12 is approximately aligned with the center of the groove 32. The current then decreases as groove 32 continues moving across beam 12 and a smaller portion of the beam cross section is intercepted by the groove 32, until particles at the far edge of the beam 12 are no longer intercepted by the groove 32 (i.e., when the trailing edge 33b of the groove 32 emerges from the beam 12). This portion of the curve is shown as region 42b in FIG. 3.

The curve in region 44 represents the secondary emission current from the time when the trailing edge 33b of the groove 32 emerges from the beam 12 to the time the wire 14 last intercepts the entire cross section of the beam 12. The current increases to approximately five times its minimum value in region 44 because the angle of incidence of the beam 12 on wire 14 increases from approximately 0° to around 90° as the beam 12 is scanned by essentially the latter half of the wire 14. For a cylindrical wire 14 and a symmetrical beam cross section, the curve in region 44 is the mirror image of the curve in region 40.

The curve in region 46 represents the secondary emission current from the time when the trailing edge of the wire 14 crosses the near edge of the beam 12 and the entire cross section of the beam 12 is last incident on wire 14 to the time when the trailing edge of wire 14 emerges from the far edge of the beam. The current decreases in region 46 because decreasing portions of the beam cross section are intercepted by the wire 14, resulting in a decrease in the number of secondary charged particles emitted. The curve in region 46 is the mirror image of the curve in region 38 when the wire 14 is cylindrical and the beam 12 is symmetrical in cross section.

If beam 12 has a cross section other than circular, the current profile will be other than that shown by the curve in FIG. 3. For example, if the beam 12 were a solid figure "8" in cross section and lying on its side so that the wire 14 traverses the lobes successively, the portion of the current profile curve in region 42 would have a peak when the center of the groove 32 intercepts the center of each lobe, and a valley therebetween when it intercepts the center of the figure "8."

If the beam is solid and of uniform geometrical cross section, the width of region 42 of the resultant current vs. time profile on the screen of the oscilloscope 30 represents the sum of the width of beam 12 and the width of groove 32. If the horizontal axis on the oscilloscope screen is calibrated in units of dimension appropriate to the beam widths being measured (e.g., microns), then the beam width may be calculated simply by subtracting the known width of the groove 32 from the calibrated width of region 42 on the oscilloscope screen. If beam 12 has an irregular cross section, however, the width of region 42 may not be as accurate a representation of the sum of the widths of the beam 12 and the groove 32 as for a beam of regular cross section. Nevertheless, it will still be a satisfactory approximation. will still be a satisfactory approximation.

An alternate way of determining the width of beam 12 is by measuring the half-width of the current profile in region 42 (i.e., the width of the profile between points when the amplitude is one-half of its peak value in region 42), and using this half-width as a direct approximate indication of the beam width (i.e., ignoring the width of the groove). Although the half-width technique does not afford as accurate a measurement of the width of beam 12 as the method involving subtracting the width of groove 32 from the calibrated width of region 42, it is a satisfactory approximation when the width of the groove 32 is at least an order of magnitude less than the width of the beam 12. The width of region 42a and that of region 42b each represents approximately the width of the groove 32. The former represents the current as the groove 32 is becoming fully immersed in the beam 12; the latter represents the current as the groove 32 emerges from the beam 12.

In order to maximize the accuracy of the determination of the cross-sectional distribution of particles in the beam, it is desirable to have as narrow a groove 32 as possible. At present, the narrowest known groove capable of use in beam width measuring apparatus is on the order of 100A.($10^{-2}$ microns) wide. A groove this narrow would give an excellent representation of the cross-sectional distribution of the particles in a beam whose width is on the order of 1 micron or wider.

While the invention is particularly suited for measuring beam widths on the order of 5 microns or less, it is also well suited for measuring beam widths greater than 5 micros. Indeed, for a given groove width, the larger the beam the more accurate the measurement. Furthermore, wider grooves may be used for larger width beams without degradation of the measurement. However, for mechanical reasons, the groove width should not be greater than approximately an order of magnitude of the wire diameter. Thus, for a 5-mil diameter wire, the groove should be no wider than essentially 0.5 mil.

As previously mentioned, the shape of the current profile curve in region 42 provides information about the cross-sectional distribution of particles in the beam. If this cross-sectional distribution is nonsymmetrical, more complete information may be obtained by simultaneously scanning the beam with a pair of scanning wires such as 14 moving in quadrature with one another i.e., moving at right angles to one another) and displaying the resultant current profile curves as discussed above.

Although the invention has been shown and described with reference to particular embodiments, nevertheless various changes and modifications obvious to a person skilled in the art to which the invention pertains are deemed to be within the spirit, scope, and contemplation of the invention.

What is claimed is:

1. Apparatus for indicating selected characteristics of a beam of secondary emission current producing particles comprising:

a movable member having first and second surface regions of distinguishable secondary charged particle emission characteristics for incident secondary emission current producing particles traveling in a predetermined direction and defining at least two essentially linear boundaries between said first and second regions;

means coupled to said member for moving said member at an essentially uniform velocity through said beam such that each of said boundaries traverses said beam in a direction essentially transverse to the longitudinal direction of said beam and essentially transverse to the length of said boundaries; and means coupled to said member for indicating the secondary charged particle emission current resulting from the incidence of said beam on said first and second surface regions during the movement of said member through said beam.

2. The apparatus claimed in claim 1 wherein said movable member is a wire at least essentially 1 cm. long.

3. The apparatus claimed in claim 1 wherein the last-named means comprises an oscilloscope for displaying said secondary charged particle emission current as a waveform, the portion of said waveform resulting from impingement of said beam on said first surface region having a width representative of the width of said beam and said first surface region.

4. The apparatus claimed in claim 1 wherein the lateral surface of said member has a longitudinal groove therein which defines said first surface region, the remainder of the lateral surface of said member defining said second surface region.

5. The apparatus claimed in claim 1 wherein the lateral surface of said member has a longitudinal ridge therein which defines said first surface region, the remainder of the lateral surface of said member defining said second surface region.

6. The apparatus claimed in claim 1 wherein the lateral surface of said member has a strip of material of secondary charged particle emission characteristics distinguishable from those of said member disposed longitudinally thereon, said strip defining said first surface region and the exposed lateral surface of said member defining said second surface region.

7. The apparatus claimed in claim 1 wherein the width of said first surface region is at least essentially an order of magnitude smaller than the width of said member.

8. In apparatus for indicating selected characteristics of a beam of secondary emission current producing particles wherein a scanning member is moved at an essentially uniform velocity through said beam in a direction essentially transverse to the longitudinal direction of said beam and essentially transverse to the length of said member, and wherein the secondary charged particle emission current resulting from the incidence of said beam on said member during the movement of said member through said beam is detected, the improvement comprising a scanning member having first and second surface regions of distinguishable secondary charged particle emission characteristics for incident secondary emission current producing particles traveling in a predetermined direction and defining at least two essentially linear boundaries between said first and second regions.

9. A scanning member according to claim 8 wherein said member is a wire at least essentially 1 cm. long.

10. A scanning member according to claim 8 wherein the lateral surface of said member has a longitudinal groove therein which defines said first surface region, the remainder of the lateral surface of said member defining said second surface region.

11. A scanning member according to claim 8 wherein the lateral surface of said member has a longitudinal ridge therein which defines said first surface region, the remainder of the lateral surface of said member defining said second surface region.

12. A scanning member according to claim 8 wherein the lateral surface of said member has a strip of material of secondary charged particle emission characteristics distinguishable from those of said member disposed longitudinally thereon, said strip defining said first surface region, and the exposed lateral surface of said member defining said second surface region.

13. A scanning member according to claim 8 wherein the width of said first surface region is at least essentially an order of magnitude smaller than the width of said member.

In order to maximize the accuracy of the determination of the cross-sectional distribution of particles in the beam, it is desirable to have as narrow a groove 32 as possible. At present, the narrowest known groove capable of use in beam width measuring apparatus is on the order of 100 A.($10^{-2}$ microns) wide. A groove this narrow would give an excellent representation of the cross-sectional distribution of the particles in a beam whose width is on the order of 1 micron or wider.

While the invention is particularly suited for measuring beam widths on the order of 5 microns or less, it is also well suited for measuring beam widths greater than 5 microns. Indeed, for a given groove width, the larger the beam the more accurate the measurement. Furthermore, wider grooves may be used for larger width beams without degradation of the measurement. However, for mechanical reasons, the groove width should not be greater than approximately an order of magnitude of the wire diameter. Thus, for a 5-mil diameter wire, the groove should be no wider than essentially 0.5 mil.

As previously mentioned, the shape of the current profile curve in region 42 provides information about the cross-sectional distribution of particles in the beam. If this cross-sectional distribution is nonsymmetrical, more complete information may be obtained by simultaneously scanning the beam with a pair of scanning wires such as 14 moving in quadrature with one another (i.e., moving at right angles to one another) and displaying the resultant current profile curves as discussed above.

Although the invention has been shown and described with reference to particular embodiments, nevertheless various changes and modifications obvious to a person skilled in the art to which the invention pertains are deemed to be within the spirit, scope, and contemplation of the invention.

What is claimed is:

1. Apparatus for indicating selected characteristics of a beam of secondary emission current producing particles comprising:

a movable member having first and second surface regions of distinguishable secondary charged particle emission characteristics for incident secondary emission current producing particles traveling in a predetermined direction and defining at least two essentially linear boundaries between said first and second regions;

means coupled to said member for moving said member at an essentially uniform velocity through said beam such that each of said boundaries traverses said beam in a direction essentially transverse to the longitudinal direction of said beam and essentially transverse to the length of said boundaries; and means coupled to said member for indicating the secondary charged particle emission current resulting from the incidence of said beam on said first and second surface regions during the movement of said member through said beam.

2. The apparatus claimed in claim 1 wherein said movable member is a wire at least essentially 1 cm. long.

3. The apparatus claimed in claim 1 wherein the last-named means comprises an oscilloscope for displaying said secondary charged particle emission current as a waveform, the portion of said waveform resulting from impingement of said beam on said first surface region having a width representative of the width of said beam and said first surface region.

4. The apparatus claimed in claim 1 wherein the lateral surface of said member has a longitudinal groove therein which defines said first surface region, the remainder of the lateral surface of said member defining said second surface region.

5. The apparatus claimed in claim 1 wherein the lateral surface of said member has a longitudinal ridge therein which defines said first surface region, the remainder of the lateral surface of said member defining said second surface region.

6. The apparatus claimed in claim 1 wherein the lateral surface of said member has a strip of material of secondary charged particle emission characteristics distinguishable from those of said member disposed longitudinally thereon, said strip defining said first surface region and the exposed lateral surface of said member defining said second surface region.

7. The apparatus claimed in claim 1 wherein the width of said first surface region is at least essentially an order of magnitude smaller than the width of said member.

8. In apparatus for indicating selected characteristics of a beam of secondary emission current producing particles wherein a scanning member is moved at an essentially uniform velocity through said beam in a direction essentially transverse to the longitudinal direction of said beam and essentially transverse to the length of said member, and wherein the secondary charged particle emission current resulting from the incidence of said beam on said member during the movement of said member through said beam is detected, the improvement comprising a scanning member having first and second surface regions of distinguishable secondary charged particle emission characteristics for incident secondary emission current producing particles traveling in a predetermined direction and defining at least two essentially linear boundaries between said first and second regions.

9. A scanning member according to claim 8 wherein said member is a wire at least essentially 1 cm. long.

10. A scanning member according to claim 8 wherein the lateral surface of said member has a longitudinal groove therein which defines said first surface region, the remainder of the lateral surface of said member defining said second surface region.

11. A scanning member according to claim 8 wherein the lateral surface of said member has a longitudinal ridge therein which defines said first surface region, the remainder of the lateral surface of said member defining said second region.

12. A scanning member according to claim 8 wherein the lateral surface of said member has a strip of material of secondary charged particle emission characteristics distinguishable from those of said member disposed longitudinally thereon, said strip defining said first surface region, and the exposed lateral surface of said member defining said second surface region.

13. A scanning member according to claim 8 wherein the width of said first surface region is at least essentially an order of magnitude smaller than the width of said member.

* * * * *

PO-1050
(5/69)

UNITED STATES PATENT OFFICE
CERTIFICATE OF CORRECTION

Patent No. 3,638,111          Dated January 25, 1972

Inventor(s) Robert M. Ennis, Jr. et al

It is certified that error appears in the above-identified patent and that said Letters Patent are hereby corrected as shown below:

Column 1, lines 7 through 9, delete "This invention . . . particles." (page 2, lines 1 through 4) (Duplication)

Column 1, lines 61 and 62, delete "emission current . . . of the beam." (page 4, lines 1 and 2) (Duplication)

Column 2, line 32, delete "and" and substitute --an--. (page 5, line 23)

Column 2, lines 54 through 56, delete "It is, . . . less." (page 6, lines 15 through 17) (Duplication)

Column 3, lines 14 and 15, delete "FIG. 1 . . . invention;" (page 7, lines 23 and 24) (Duplication)

Column 3, lines 23 through 25, delete "FIG. 3 . . . beam." (page 8, lines 1 through 3) (Duplication)

Column 4, lines 1 through 14, delete "The wire 14c . . . beam 12." (page 10, lines 3 through 16) (Duplication)

Column 4, line 51, after "text.", begin a new paragraph. (page 11, line 15)

Column 5, line 42, delete "will . . . approximation." (page 14, line 1) (Duplication)

Column 5, line 72, delete "5 micros" and insert --5 microns--. (page 15, line 4)

Column 7, line 28 through column 8, line 71, delete "In order . . . "member." (Page 14, line 14 through end) (Duplication)

Signed and sealed this 6th day of March 1973.

(SEAL)
Attest:

EDWARD M. FLETCHER, JR.        ROBERT GOTTSCHALK
Attesting Officer                  Commissioner of Patents